United States Patent [19]
Hall et al.

[11] Patent Number: 5,463,303
[45] Date of Patent: Oct. 31, 1995

[54] MULTILAYER SEPARATE WINDINGS OF INDUCTIVE CHARGE COUPLER FOR AUTOMOBILE BATTERY CHARGING TRANSFORMER

[75] Inventors: John T. Hall, Woodland Hills; Herbert J. Tanzer, Topanga, both of Calif.

[73] Assignee: Hughes Aircraft Company, Los Angeles, Calif.

[21] Appl. No.: 146,763

[22] Filed: Nov. 2, 1993

[51] Int. Cl.$^6$ .............................. H02J 7/00; H01F 27/08; H01F 27/30
[52] U.S. Cl. .................. 320/2; 336/60; 336/83; 336/183; 336/DIG. 2
[58] Field of Search .................... 320/2; 336/60, 336/61, 59, 58, 55, 183, DIG. 2, 83

[56] References Cited

U.S. PATENT DOCUMENTS

| | | | |
|---|---|---|---|
| 1,742,985 | 1/1930 | Burnham | 336/60 |
| 5,010,314 | 4/1991 | Estrov | 336/183 |
| 5,175,525 | 12/1992 | Smith | 336/83 |
| 5,216,402 | 6/1993 | Carosa | 336/DIG. 2 |
| 5,331,536 | 7/1994 | Lane | 336/183 |

*Primary Examiner*—Thomas J. Kozma
*Attorney, Agent, or Firm*—Leonard A. Alkov; W. K. Denson-Low

[57] ABSTRACT

The primary windings and part of the magnetic circuit of an automobile battery charging transformer are mounted in a separable multiple panel inductive charge coupler which is insertable into and removable from corresponding inductive charge receptacle slots in the automobile adjacent the transformer secondary windings and magnetic structure. The use of thin primary and secondary coils decreases the resistance losses in the coils. When the inductive charge coupler is in place and is energized, the primary winding energizes the secondary winding to permit charging of the batteries on the automobile.

14 Claims, 2 Drawing Sheets

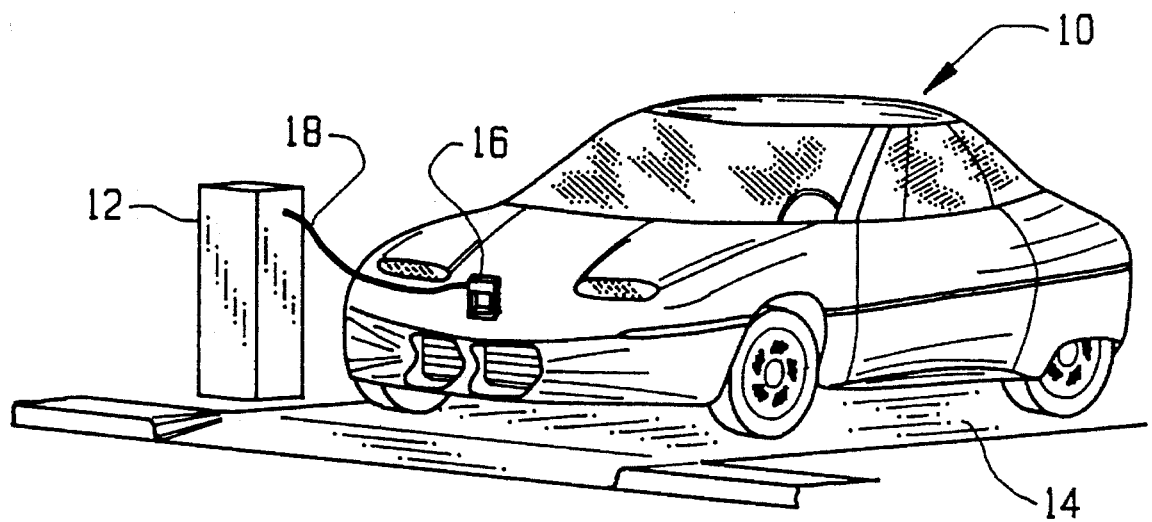
FIG. 1
FIG. 2
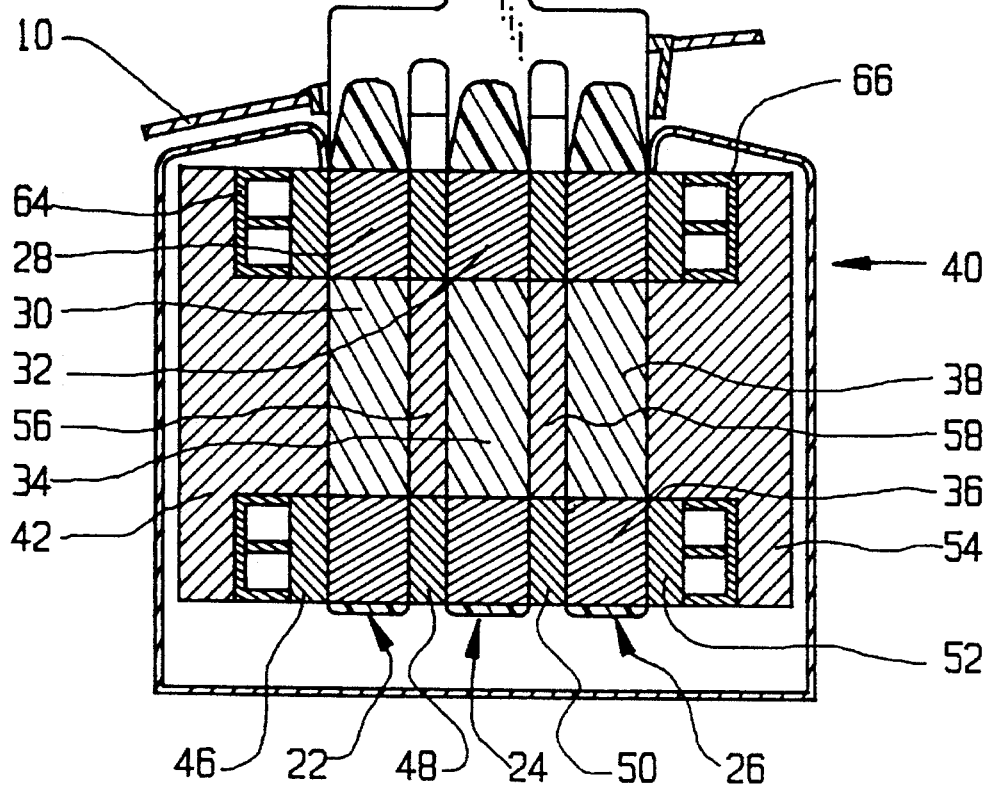

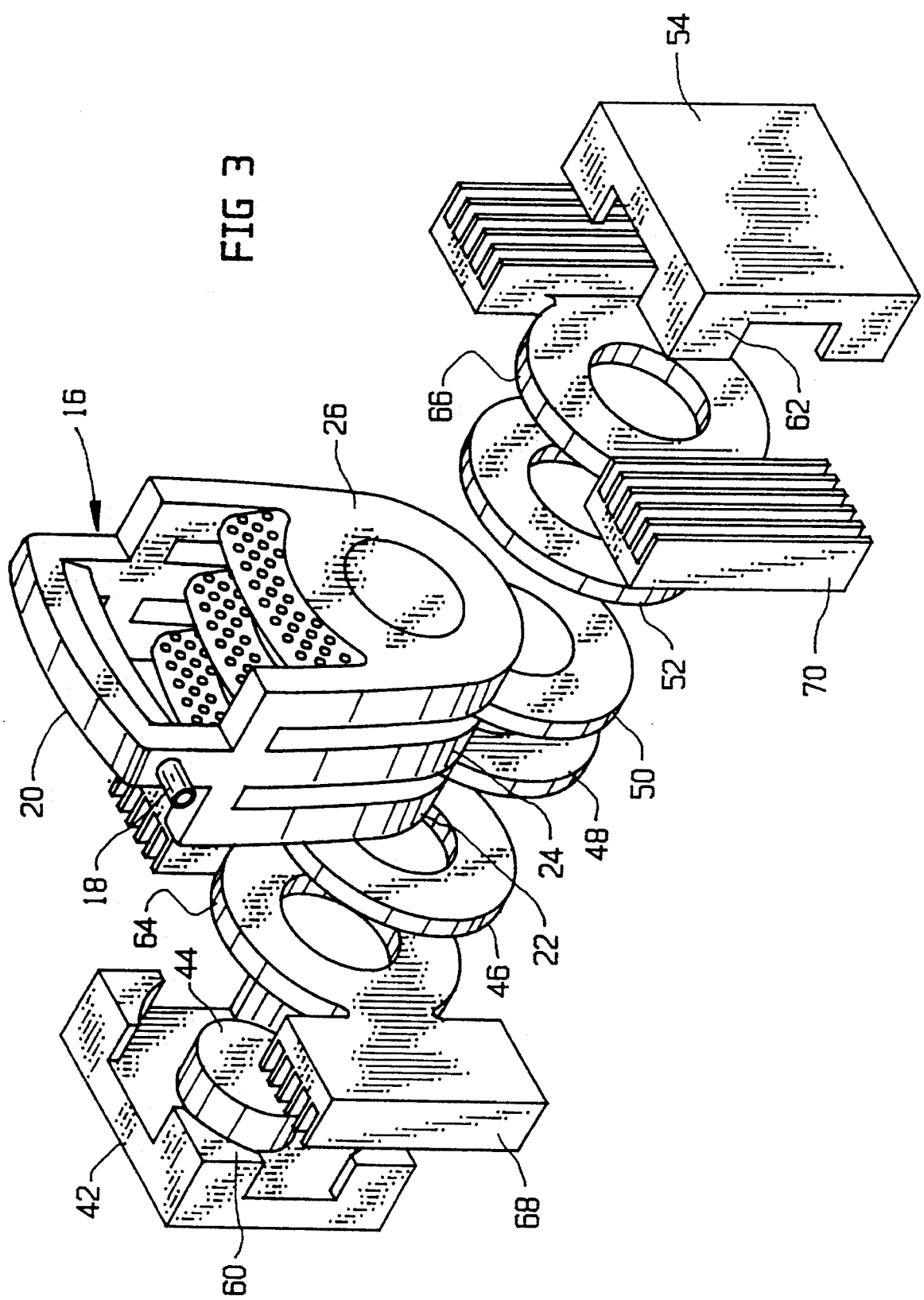

MULTILAYER SEPARATE WINDINGS OF INDUCTIVE CHARGE COUPLER FOR AUTOMOBILE BATTERY CHARGING TRANSFORMER

FIELD OF THE INVENTION

In charging the batteries of automobiles, a transformer primary inductive charge coupler is inserted into the transformer secondary inductive charge receptacle on the automobile, which thence charges the batteries of the automobile. The primary inductive charge coupler and its secondary windings are separate thin windings for optimum inductive coupling at high frequencies.

BACKGROUND OF THE INVENTION

In order to reduce air pollution, there is a modern trend toward electrically powered automobiles. These electrically powered automobiles have rechargeable batteries therein. The power of the batteries is used to propel the automobile and to provide for other power needs thereof. The design of such a vehicle is a careful balance between payload, performance, range between charging, acceleration, and speed. No matter what the combination of these criteria, there is need to recharge the batteries periodically so that the automobile may be taken on another excursion. With fairly large battery capacity, there is need to recharge a substantial amount of power. Since the time when an automobile is unavailable should be minimized, high charging rates are desirable. If an ordinary plug is to be used, the plug must be suited for high power, which brings about a risk of harm to the operator and/or other people in the vicinity from contact with parts of the electrical supply system.

It is, thus, desirable to make a coupling between the charging station and the automobile which does not require the direct transfer of electricity. A magnetic coupling is desirable. In accordance with this invention, an inductive charge coupler can be manually handled and inserted in an appropriate inductive charge receptacle slot in the automobile. The inductive charge coupler is a transformer primary and contains an appropriate magnetic conductor. The inductive charge receptacle slot contains the secondary winding(s) together with the rest of the magnetic core. The transformer secondary in the automobile is connected through appropriate electrical equipment to the battery for the charging thereof.

The frequency is preferably much higher than the ordinary power line frequency for advantageous coupling, and high charge rates are above 10 kilowatts. The result is that there are losses in the coupling system which result in heat. The amount of heat dissipated from the transformer coils, magnetic coils and other electronics contained within the inductively coupled connector transformer container can exceed 50 watts. In order to minimize the temperature rise of the equipment, the losses should be minimized. The primary inductive charge coupler is preferably cooled. It is desirable to keep the temperature level of the inductive charge coupler within tolerable, comfortable limits. In addition, it is desirable to cool the entire transformer so that its internal temperatures do not exceed the operating range of the materials used in the connector housing.

Cooling could be achieved in the automobile, but it is desirable to limit the total automobile weight as much as possible. It is, thus, desirable to improve the cooling methods for the inductively coupled charging connection. It is also useful to employ offboard cooling sources to cool the transformer primary coil and magnetic core efficiently in the inductive charge coupler. This offboard cooling reduces the entire primary transformer structure and reduces the surface temperature of the removable inductive charge coupler.

Losses, and consequently heating, can be reduced by design of the coils and their location. The AC resistance losses (the eddy current losses) are reduced by reducing the number of consecutive layers in the axial direction of the magnetic field. By separating the coil layers, in both the primary and secondary, a greater surface area is achieved so that there is increased surface area across which cooling air may flow.

SUMMARY OF THE INVENTION

In order to aid in the understanding of this invention, it can be stated in essentially summary form that it is directed to an inductive charge coupler in the form of several primary coil layers spaced from each other and magnetic material layers for insertion into the inductive charge receptacle which includes transformer secondary layers spaced from each other and the balance of the magnetic circuit so that the spaced primary and secondary coils are interleaved when the coupler is inserted into the receptacle for transformer coupling of power.

It is, thus, a purpose and advantage of this invention to provide a system for automobile battery charging which includes a transformer having a separable primary so that the primary may be energized from a stationary source and inserted into the transformer inductive charge receptacle to energize the magnetic circuit therein and the electrical secondary circuit therein.

It is another purpose and advantage of this invention to provide an automobile battery charging system which includes a transformer having a portion thereof separable from the automobile with the separable portion having multiple layers of primary windings thereon to minimize thickness of the primary windings in the direction of the magnetic field and to increase surface area for cooling.

It is another purpose and advantage of this invention to provide a transformer which is separable, with a secondary portion mounted on a vehicle for the charging of the batteries on the vehicle and the primary portion being separable and powered from an off-vehicle source. The primary portion of the transformer is an inductive charge coupler with multiple separate leaves, each having a primary coil thereon which is thin in the axial direction of the magnetic field, and the fixed portion of which is an inductive charge receptacle which has a plurality of secondary coils therein which are thin in the direction of magnetic field so as to reduce eddy current losses to limit general losses and the temperatures of the associated parts.

It is a further purpose and advantage of this invention to provide a separable automobile battery charging transformer, a portion of which remains on the automobile and a portion of which is separable therefrom so as to be permanently connected to a power supply. The separable portion is provided with cooling, which also acts to cool the portion permanently installed in the automobile.

Other purposes and advantages of this invention will become apparent from a study of the following portion of the specification, the claims and the attached drawings wherein:

BRIEF DESCRIPTION OF THE DRAWINGS

FIG. 1 is a perspective view of an electrically powered automobile which is connected to a stationary battery charging source.

FIG. 2 is an enlarged axial sectional view of the inductive charge coupler which carries the primary transformer windings, a portion of the magnetic circuit material, and which is inserted into the inductive charge receptacle which carries the corresponding secondary transformer windings and the remaining portion of the magnetic circuit so as to form the inductive charge coupling.

FIG. 3 is an exploded view of the inductive charge receptacle with the inductive charge coupler lying adjacent thereto.

DESCRIPTION OF THE PREFERRED EMBODIMENTS

Automobile 10 is an automotive vehicle configured for the transportation of a few people and some baggage. It carries batteries which power motors which are connected to the road wheels. Suitable electrical and mechanical controls are provided to control the speed and direction of the vehicle. The onboard battery must be recharged periodically. In the system in accordance with this invention, charging power comes from a fixed power source 12 which is located adjacent the position where the automobile 10 will be parked. In the present illustration, the automobile 10 is parked on its driveway 14 near the home of the owner of the automobile. A fixed power source 12 may also be located adjacent the parking position of the automobile when the owner is working or shopping.

It is presupposed by this invention that the automobile will not be directly powered from the power source 12 by means of a direct plug-in, but the charging connection will be inductive. A transformer primary coil is designed to receive power from the power source 12 and to deliver the power through magnetic coupling to a transformer secondary coil in the automobile. The secondary coil is appropriately connected to charge the automobile batteries. The power supply frequency is chosen in connection with the overall power supply parameters, including the transformer parameters. Inductive charge coupler 16, is seen plugged into the inductive charge receptacle of the automobile 10 in FIG. 1. The coupler 16 is seen in vertical section in FIG. 2. The coupler 16 is connected to the fixed power source by means of cable 18. The cable 18, seen in FIGS. 1 and 3, incorporates the electrical cable, coolant tubes (if necessary), and control signal circuitry. As seen in FIGS. 2 and 3, inductive charge coupler 16 has a handle 20 by which it can be manually manipulated.

The coupler 16 has three panels 22, 24 and 26 mounted on the handle so that they are manipulated by the handle. The panels are spaced from each other. Each of the panels is supported by a non-magnetic structure extending down from the handle, and each of the panels has a primary winding thereon and a magnetic core which serves as part of the magnetic circuit. FIG. 2 shows primary winding 28 and magnetic core 30 in panel 22. It also shows primary winding 32 and magnetic core 34 in panel 24. FIG. 2 also shows the primary winding 36 and magnetic core 38 in panel 26. These magnetic cores and windings are circular, and the section in FIG. 2 is taken on the circular axis thereof. This inductive charge coupler is the unit which is manipulated by the handle 20 and serves as a transformer primary.

The inductive charge receptacle 40 is compatible and physically receives the coupler and magnetically couples therewith. The receptacle 40 has slots to receive the panels on the coupler, has secondary windings, and has the magnetic structure to complete the magnetic circuit. The magnetic material is preferably low loss ferrite material. Starting from the left end of the receptacle, seen in FIGS. 1 and 3, magnetic cap 42 has a core 44 which lies against the core 30. Secondary winding 46 lies around the core and against winding 28. Secondary windings 48 and 50 lie between winding 28 and 32 and 32 and 36, respectively. Secondary winding 52 lies between primary winding 36 and magnetic cap 54. Magnetic cores 56 and 58 lie within secondary windings 48 and 50 so that a complete interior magnetic core within the windings is achieved. The magnetic circuit is completed around the sides of the coils by means of four fingers on each of the caps which are in direct contact and engagement. For example, finger 60 on cap 42 is in direct contact with finger 62 on cap 54.

The inductive charge receptacle 40 is illustrated as having built-in cooling. There are coolant channels in cooling ring 64 and coolant channels in cooling ring 66, seen in both FIGS. 2 and 3. The coolant channels are connected to radiators. The near side radiators 68 and 70 are seen in FIG. 3. There are similar back side radiators. Coolant can flow from the channels into the radiators through normal convection or through phase change heat pipes, as may be required by the installation.

The magnetic coupling is enhanced between the inductive charge coupler and the inductive charge receptacle by the thinness, in the axial direction, of the electrical windings in both the coupler and receptacle. It has long been recognized that the AC resistance $R_{ac}$ of windings can be very much higher than the DC $R_{dc}$ resistance depending on the frequency, winding geometry and the thickness of the layers. An $R_{ac}/R_{dc}$ ratio up to 100 is quite possible. Winding resistance increases of this magnitude cannot be ignored when energy loss and heating of the coupler is important. The original calculations were for sine waves, see Dowell, P. L., "Effects of Eddy Currents in Transformer Windings," Proceedings IEE, Volume 113, No. 8, August 1966, pp. 1387–1394. It has since been recognized that the details of the rise and fall of current versus time have a significant effect on the ratio. As a result, in order to derive accurate estimates of $R_{ac}$, the calculations must be based on the actual waveforms in the circuit. Winding design and optimization cannot be based on data derived from a sinusoidal approximation, but must be tailored to the waveforms which actually occur. The equations used in the calculations are moderately complex, and the number of harmonics is often surprisingly large. Thus, computation is difficult.

In general, it can be noted that, when the thickness of the winding layer is small compared to the skin depth at the operating frequency, the ratio of $R_{ac}/R_{dc}$ is essentially one. However, as the winding layer thickness approaches the skin current thickness, the ratio rapidly rises, especially when the number of winding layers is larger than one. The conclusion is that, in order to minimize loss, the number of layers in the axial direction of the magnetic field must be minimized. This is achieved by providing three panels, thus dividing the primary into three windings and providing for corresponding secondary windings. Higher power transfer efficiency is achieved together with less loss, which would cause heating.

Interleaving is a new concept for a very high power density, high power, high frequency transformer design. In the past, high power density transformers have been limited by thermal limitations of cooling the internal copper winding of the transformer. Cooling has been easily performed at low frequency (60 and 400 hz) by making the winding a hollow tube winding and pumping a coolant (oil, water, etc.) through it. This cannot be performed at high frequency (greater than 10 khz) due to excessive eddy current losses introduced by the excessive thickness of the tube that is required. Interleaving is best applicable, but not limited to, windings with a large surface area, such as flat helix or flat spiral winding, and can be directly applied to any transformer design and specifically applicable to the design of inductive coupled transformer for electric vehicles. The thermal limitations are worst for separable transformers where the transformer primary is designed to be physically inserted into the transformer core since there is not a good thermal contact of the primary to the transformer core. The transformer winding for this application is referred to as an inductive charge coupler.

In transformer design, high frequency operation is desired to reduce the magnetic core size. This is based on the fundamental magnetic equation rewritten as:

$$A_c = \frac{E}{4fNB \times 10^{-8}}$$

where:
- f = frequency in cycles per second
- $A_c$ = core area n square meters
- E = magnetic path length in meters
- N = number of primary turns
- B = flux density, in gauss Thus it can be seen that the magnetic core can be smaller, if higher frequency is used to excite the core. However, this is in conflict with the copper losses of the winding, which increase in winding loss is a result of the eddy current losses.

Eddy current loss is a collective term for the redistribution of alternating current in conductors as a function of frequency (skin effect), and the phenomenon where one circuit carrying alternating current can induce circulating currents without making ohmic contact in any conductive material in the immediate vicinity of the circuit (proximity effect). Thus there is a fundamental limitation on how small the transformer core can be, based on the cooper losses, thus:

Eddy losses = skin effect losses + proximity losses The skin effect loss is an increase in effective resistance due to high frequency current carried by the winding conductor alone. This occurs because, as frequency rises, current density increases at the conductor surface and decreases toward zero at the center. The current tails off exponentially within the conductor. The portion of the conductor that is actually carrying current is reduced, so the resistance at high frequency (and resulting losses) can be many times greater than at low frequency. Skin depth (SD) is defined as the distance from the surface to where the current density is 1/e times the surface current density (e is the natural log base).

Although the current density tails off exponentially from the surface, the high frequency resistance is the same as if the current density were constant from the surface to the penetration depth then went abruptly to zero. What this means is that, regardless of the a layer of foil's thickness, the minimum resistance (AC resistance at a specified frequency) is limited to the DC resistant at the skin depth. Thus for one layer, the layer thickness may be as thick as desired with no increased losses above the skin depth. As along as no proximity effects are introduced, the layer thickness can be very thick to accommodate the structure.

For multilayer coils, the proximity effect is often the dominant effect. The apparent increase in the resistance of the conductors is caused by eddy currents in the conductors due to the magnetic fields impressed upon the conductors from other conductors in the windings. Note, however, that these eddy currents will exist even if the winding is open circuit. The losses exist with no net current flow giving an infinite resistance. Due to the turn by turn construction technique, the coil thickness is not critical with this approach. Having a thicker winding does not lower the design losses. However, it does not hurt the design either since the losses are only skin effect and not proximity losses. This is another primary advantage of this approach. The thickness of the winding for the non-fully interleaved winding is critical due to the proximity losses. Due to the proximity losses, the thickness of the winding results in increased losses.

The following are examples of transformer losses in high frequency, single turn coils. In each example, there are three primary coils and four secondary coils. Each of the coils is one circular turn having an outside diameter of 4.6 inches and an inside diameter of 3 inches. The thickness of each coil is 0.015 inch. The coil material is copper.

In each of the following examples, the input power is 6,600 watts, converter efficiency is 90 percent, the primary current is 29.5 amperes rms, secondary current is 18.5 amperes rms, copper temperature is 60 degrees C, frequency is 100 kilohertz, and current waveform is approximately a sine wave. With these operating parameters, the coils are arranged in three different manners of layering in the following three examples.

EXAMPLE 1

In this example, the four secondary turns are laid together, and the three primary turns are laid together against one side of the secondaries. In this arrangement, the primary copper loss is 14.18 watts, the secondary copper loss is 10.82 watts for a total copper loss of 25 watts.

EXAMPLE 2

In this structure, the three primary turns are laid together and two of each of the secondary turns are laid together, and against the opposite sides of the primary turns. In this case, the primary copper loss is 4.99 watts, the secondary copper loss is 3.32 watts for a total copper loss of 8.21 watts.

EXAMPLE 3

This example interleaves the three primary turns and four secondary turns in accordance with this invention. The primary turns have a secondary turn on each side thereof to form an alternating stack. In this organization, the primary copper loss is 3.17 watts, the secondary copper loss is 1.45 watts, and the total copper loss is 4.62 watts. This shows that, with this organization, copper loss and heating are minimized.

This invention has been described in its presently contemplated best mode, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. An automobile charging transformer comprising:
    a transformer primary inductive charge coupler for attachment to a fixed alternating current power supply, said coupler having a plurality of spaced primary electric coils;
    a transformer secondary inductive charge receptacle with secondary coils for mounting in the automobile to charge the battery of the automobile, said transformer secondary inductive charge receptacle having a plurality of slots therein, each corresponding to one of said primary electric coils; and a magnetic core associated with said primary electric coils and said secondary electric coils to complete the magnetic circuit through said primary and secondary coils, said transformer primary inductive charge coupler being separable from said transformer secondary inductive charge receptacle so that the automobile can depart from the fixed power supply.

2. The automobile charging transformer of claim 1 wherein each of said primary coils and each of said secondary coils has a magnetic member therein to complete the magnetic circuit therethrough.

3. The automobile charging transformer of claim 2 wherein each of said coils is a flat annular coil having a rectangular cross section.

4. The automobile charging transformer of claim 2 wherein there is one more of said secondary coils than said primary coils so that said secondary coils lie on both sides of said transformer primary inductive charge coupler as well as between the primary coils thereof.

5. The automobile charging transformer of claim 4 wherein there is means for cooling said transformer associated with said transformer.

6. The automobile charging transformer of claim 5 wherein said means for cooling comprises a coolant fluid passage adjacent at least one of said secondary windings and means for extracting heat from said coolant fluid passage.

7. An electric automobile having an electric propulsion motor and an electric battery connected to and energize said propulsion motor and charging means for said battery so that said battery can be charged from a fixed power source, comprising:

a transformer secondary mounted on said automobile, said transformer secondary having at least three secondary coils with slots between said secondary coils to define a transformer secondary inductive charge receptacle on said automobile;

a transformer primary inductive charge coupler connected to a fixed power source, said inductive charge coupler having at least two transformer primary coils therein, one corresponding to each of said slots between said transformer secondary coils, said transformer primary inductive charge coupler being configured to be inserted into said inductive charge receptacle so that said transformer primary and transformer secondary coils are alternated and lying adjacent each other; and magnetic core material associated with said primary and secondary coils to complete a magnetic circuit through said coils so that said coils are magnetically coupled.

8. The automobile of claim 7 wherein said primary and secondary coils are both of flat annular toroids of rectangular cross section and circular openings therethrough have magnetic material therein so as to complete the magnetic circuit through the interior of said coils.

9. The automobile of claim 8 wherein there are n+1 secondary coils to define n spaces therebetween and there are n number of primary coils to correspond to said spaces.

10. The automobile of claim 9 where n is three.

11. The automobile of claim 9 wherein there is a coolant fluid passage adjacent at least two of said coils and there is means for extracting heat from said fluid passage to cool said transformer.

12. The automobile of claim 7 wherein each of said primary and each of said secondary coils is a single turn coil.

13. The automobile of claim 7 wherein each of said coils is a circular coil.

14. The automobile of claim 7 wherein each of said coils is a single turn circular coil.

* * * * *